(12) United States Patent
Hill, Jr.

(10) Patent No.: US 8,105,052 B1
(45) Date of Patent: Jan. 31, 2012

(54) WAVE AND TIDE ACTUATED RENEWABLE ENERGY PUMP

(76) Inventor: Richard Newton Hill, Jr., Gettysburg, PA (US)

( * ) Notice: Subject to any disclaimer, the term of this patent is extended or adjusted under 35 U.S.C. 154(b) by 860 days.

(21) Appl. No.: 12/220,244

(22) Filed: Jul. 23, 2008

Related U.S. Application Data

(63) Continuation-in-part of application No. 10/600,701, filed on Jun. 23, 2003, now abandoned.

(60) Provisional application No. 60/390,421, filed on Jun. 24, 2002.

(51) Int. Cl.
*F04B 17/00* (2006.01)
*F03B 13/18* (2006.01)

(52) U.S. Cl. .............. 417/331; 60/497; 60/504

(58) Field of Classification Search ............. 417/330, 417/331; 92/137; 60/398, 498, 497, 504; 290/42, 54
See application file for complete search history.

(56) References Cited

U.S. PATENT DOCUMENTS

| | | | | |
|---|---|---|---|---|
| 4,442,887 A | * | 4/1984 | Anderson | 165/85 |
| 5,105,094 A | * | 4/1992 | Parker | 290/53 |
| 5,435,134 A | * | 7/1995 | Nielsen | 60/398 |

* cited by examiner

*Primary Examiner* — Charles Freay

(57) ABSTRACT

A pumping mechanism that utilizes wave and tidal energy to operate. The mechanism relies on the depth of the fluid or sea and the length of the pump cylinder to accommodate shifting wave and tide patterns. Alternatively, the mechanism is imbedded or placed in an excavation in the fluid or ocean bed of sufficient depth and width to accommodate the piston cylinder, its' easing and the shifting wave and tide conditions. The invention relies on a buoy or float for the lift of a ballast weighted piston and the ballast weighted piston, when descending, provides the means of creating pressure on the water entrapped in the cylinder, thus causing a pumping action. The pump may be used individually or in concert with other pumps. The pump is intended to move large or small volumes of water at high or low pressures, singularly or in concert with other pumps.

16 Claims, 11 Drawing Sheets

WAVE AND TIDE ACTUATED RENEWABLE ENERGY PUMP

CROSS REFERENCE TO RELATED APPLICATIONS

This is a Continuation In part based on Utility patent application Ser. No. 10/600,701 filed Jun. 23, 2003 now abandoned and Provisional Patent Application Ser. No. 60/390,421, filed Jun. 24, 2002, by current applicant, Richard Newton Hill, Jr., entitled "WAVE AND TIDE ACTUATED PUMP." Applicant claims use of this prior filing date.

BACKGROUND OF INVENTION

This wave and tide actuated pump will satisfy most of the world's energy requirements. By harnessing ½ of 1% of the renewable energy in the ocean waves, the entire world's energy needs can be met. This pump will replace oil, gas, coal and nuclear power as primary sources of energy. It is these sources of energy that are causing pending and future conflicts in the Middle Fast and the world.

More importantly, by the year 2025 the world will run out of food and water sufficient to support the world's population. This pump again provides the answer.

This pump is the best deterrent to war that we have.

SUMMARY OF INVENTION

This invention is designed specifically with deep water applications in mind, using the length of the pumping cylinder and the depth of the sea or medium in which it used to accommodate changing wave and tide conditions. Rather than being hindered by the depth of the sea, this invention takes advantage of it. This invention and design is simplistic and robust enough to withstand the most severe rigors of the oceanic environment. This invention is equally suitable for shallower waters when imbedded or used in an excavation of sufficient depth in the fluid or ocean bed.

The molecular excitation that causes the body of water to raise and lower as a wave or ocean swell is not restricted to the surface of the body of water but continues down several feet from the surface. The buoy diameter is thus determined by the depth of wave action below the surface and by the amount of surplus buoyancy needed to raise the buoy, as close as possible, to same speed as the wave is traveling vertically. Typically, a wave action is transmitted approximately 15 feet beneath the surface. Ideally, the buoy should displace water down to the maximum depth of the wave action and the piston weighted according to this displacement. An additional volume of buoyancy is added sufficient to insure the buoy travels upward, as close as possible, to the same speed of the wave in its' up and down motion but not sufficient enough to keep from positioning buoy within the desired angle of repose in ocean currents with the aid of additional mooring lines if necessary.

I have determined several significant uses for this pump. Some of which are—

1. Pump the ocean water over, around or tunnel-through, obstructions such as mountain ranges, spread the ocean water out on the desert floor. The resultant evaporation shall form clouds and the prevailing winds will carry the moisture to the next natural or man made barrier, causing rain to fall. In addition, hydro-electric power shall be created. The resultant salt water basins created shall be used to concentrate and extract minerals from the sea as well as removing man made pollutants from the world's oceans. Surplus sea water shall be allowed to flow back into the ocean. Once the feasibility is proved, Morocco with the Atlas Mountains and the Sahara need to be a top priority. The Western United States should prove to be an excellent model for what can be done in the rest of the world. The creation of this new farmland, water and energy will eliminate current and future world conflicts and, God willing, shall give us peace and prosperity for ONE THOUSAND YEARS!

2. Creation of Hydro-electric power: Either directly pumping the water to a submerged turbine with surge tank or by pumping the water behind a dam and allowing it to flow out uniformly to hydro-electric turbines. The surplus energy should make coastal states the most financially solvent and prosperous states in the US while consumer energy bills drop to an insignificant cost and energy rationing is eliminated.

3. Desalination Of Sea water: The energy pump can be the source of power for conventional desalination plants, dramatically reducing the cost of operation as energy consumption will now be a minimal factor, making desalination of sea water practical in fresh water deprived parts of the world.

4. Seafood Farming: Pump sea water to a levied area and raise fish or shrimp, etc. When ready for harvest, let the water out through the levee's flood gate and scoop up the fish or shrimp by hand or mechanically, eliminating the need for shrimp and fish trawlers, while guaranteeing a full harvest. This is similar to what is being done in some other countries now, using their high tides to capture the water behind levees.

5. Land Reclamation from the sea, etc.: Again, a levee would be thrown up with the pump on the ocean or sea side. The suction would run under the levee and excavate the water behind the levee, leaving dry land.

6. In the "dead" areas of the ocean: Where oxygen has been depleted, killing off marine life, the pump would be used to circulate oxygen rich water in, eliminating the "dead" area of the sea.

7. Oil and contaminant reclamation: At surface level, a containment barrier, as is used today, would be put in place. A skimmer funnel would be placed inside the containment area just below the surface, its' suction leading back down to one or more pumps. The contaminants could be pumped up to a Tender, where further skimming would transpire. A final phase can be introducing the oil/sea water mix into boiling brine. The difference in the specific gravity the three materials would allow for a clean cut, removing the remaining and now useable oil. Alternatively, the contaminants could be pumped to a levied area on shore for further processing, containment confinement and removal. A similar process, but with the suction at the bottom of the ocean, can be developed for crude such as Bunker "C", which have a tendency to remain on the seabed floor and eventually wash ashore in balls of oil/sea water contaminants.

DETAILED DESCRIPTION OF INVENTION

Figure 1:
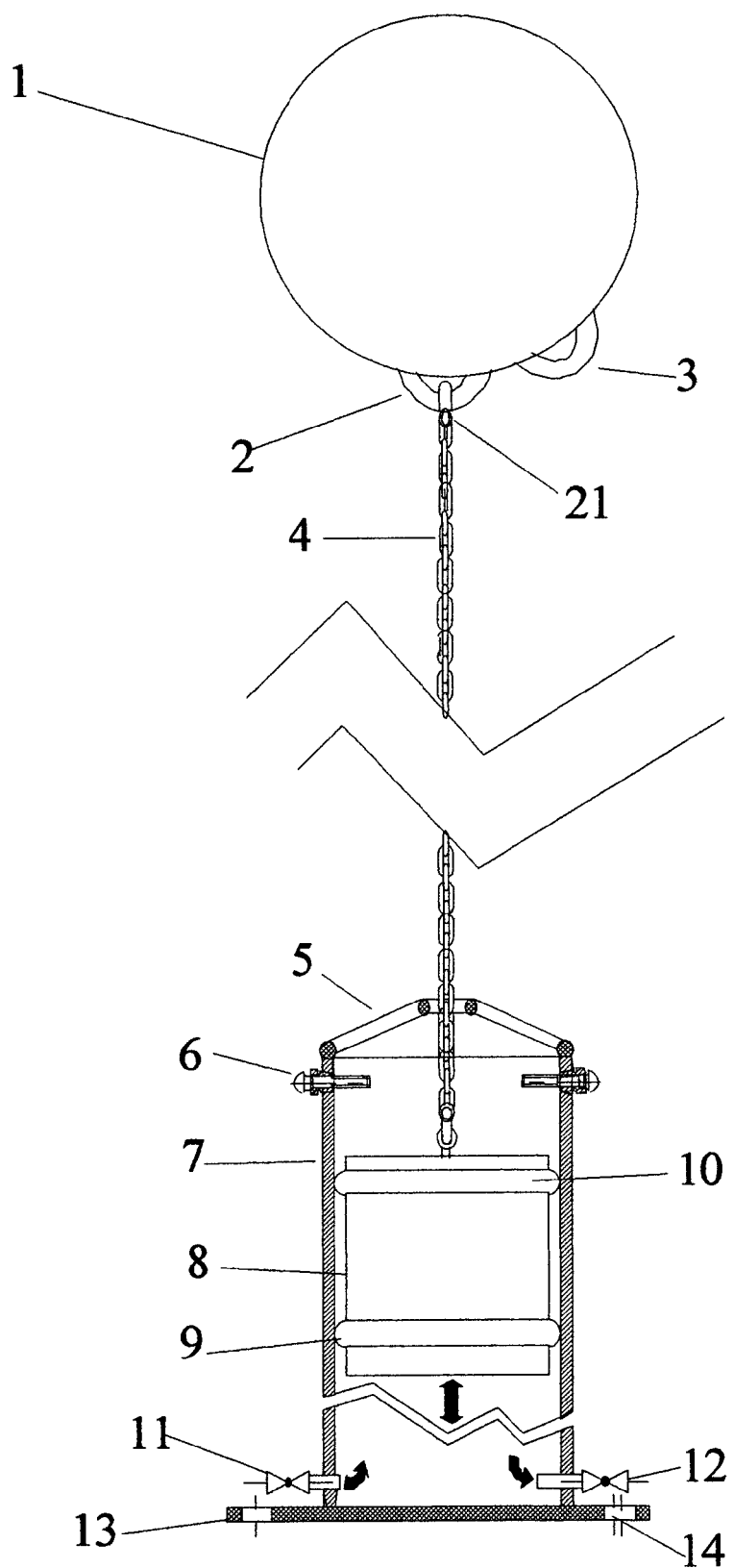
FIG. 1 of 11 shows the lifting buoy, connecting chain or cable and a cross section of the pumping mechanism to be mounted on the bed of the ocean and sea floors.

The buoy (1), shown in FIGS. 1, 2, 9 and 10 is sufficient in size to capture as much wave energy as is practical. The buoy (1) has a lifting eye or anchorage (2) in which a shackle (21) or clevis is secured. A chain or cable (4), is attached to shackle (21). An additional mooring eye (3) is provided for anchorage to tether the buoy (1) against strong prevailing currents such as the Gulf and Japanese Streams off the respective east and west coasts of the US.

Figure 2:
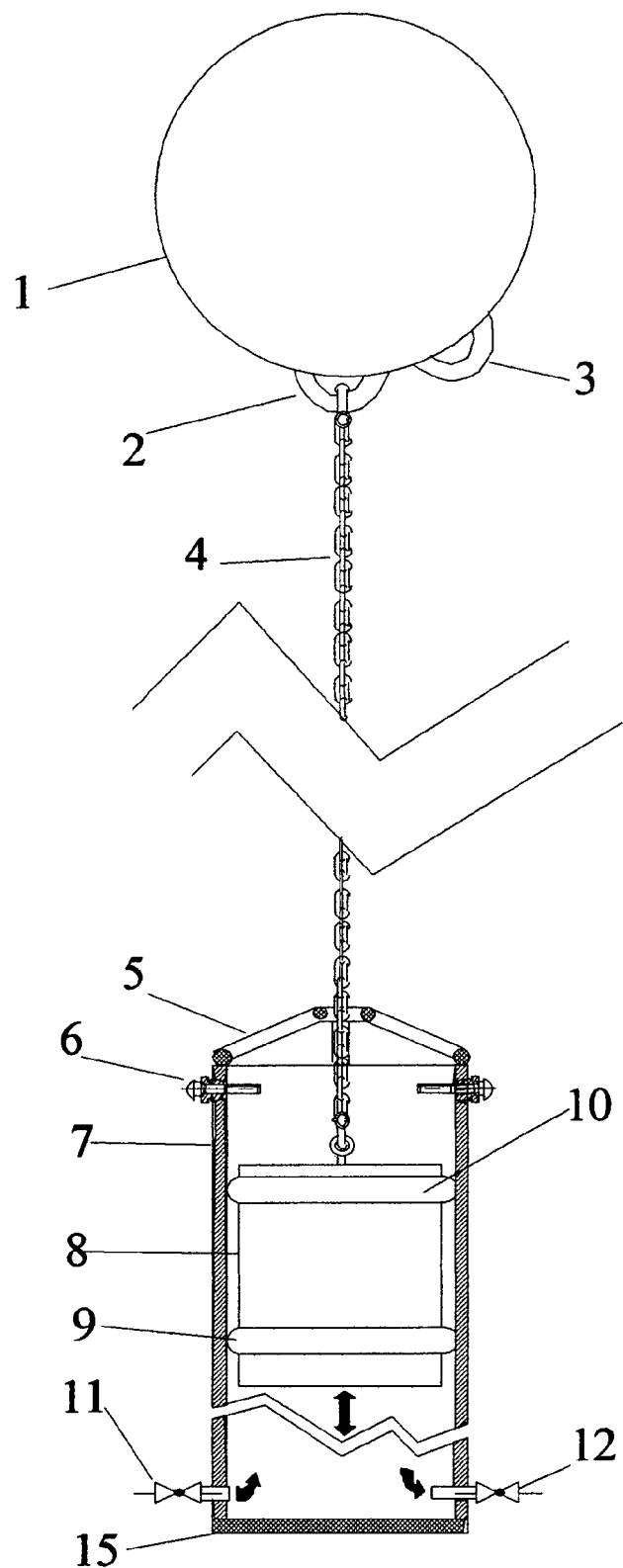
FIG. 2 of 11 shows the lifting buoy, connecting chain or cable and a cross section of the pumping mechanism as to be designed to be imbedded in the bed of the ocean and sea floors.
Figure 3:
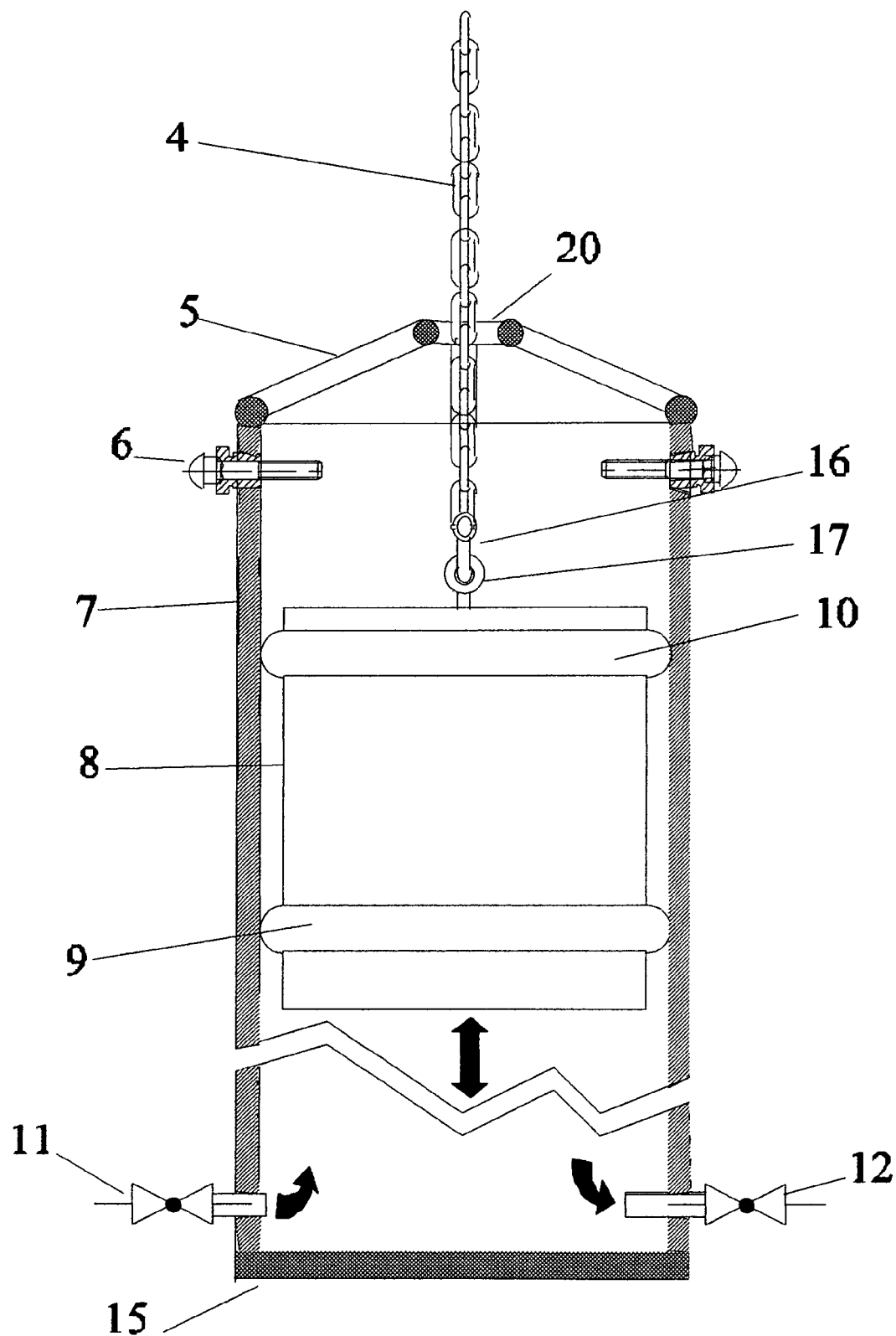
FIG. 3 of 11 shows the lifting chain and a closer look at the cross section of the pumping mechanism as prepared for imbedding in the ocean floor.
Figure 4:
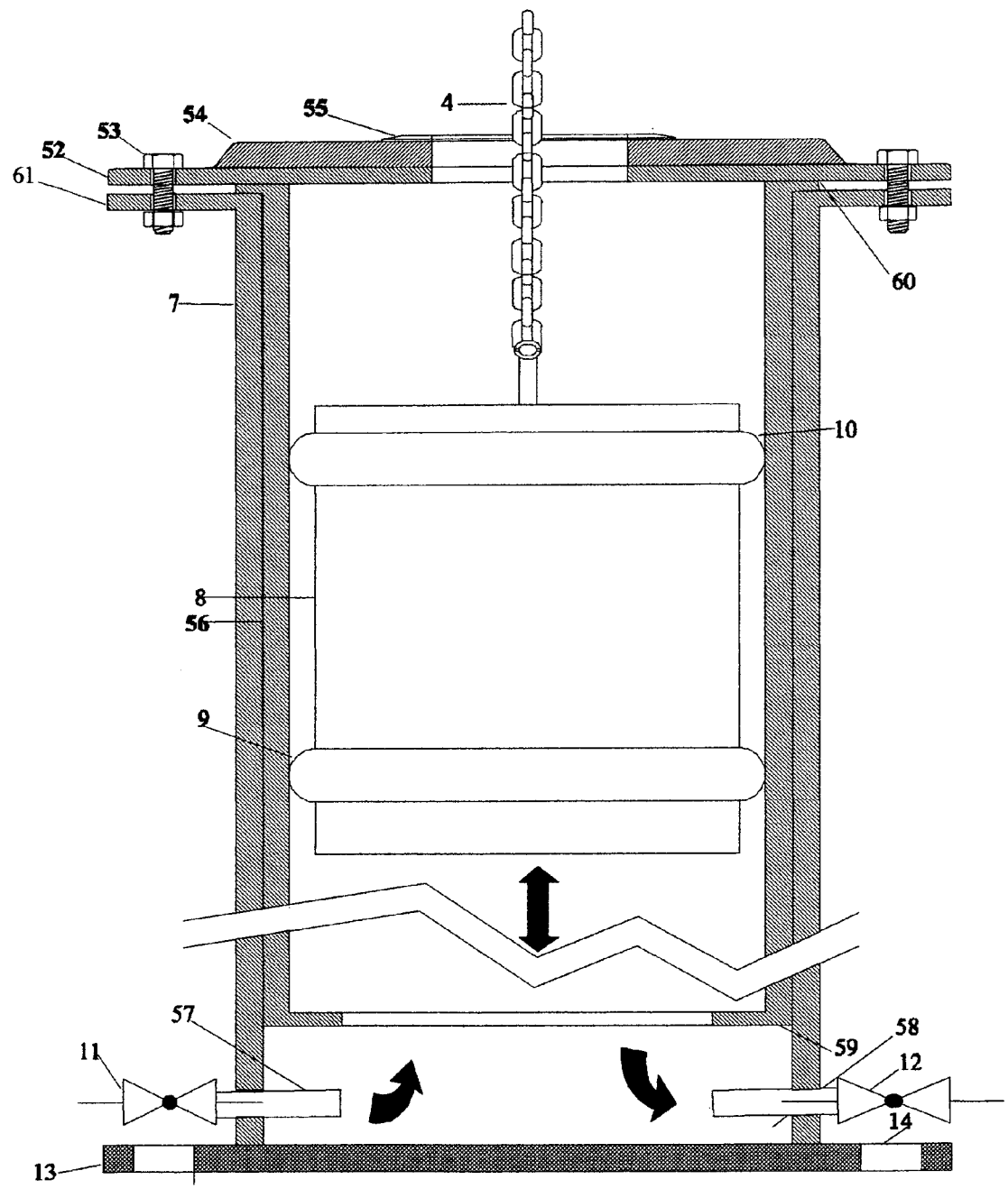
FIG. 4 of 11 shows the pump cylinder with a replaceable pump cylinder sleeve and related components.
Figure 5:
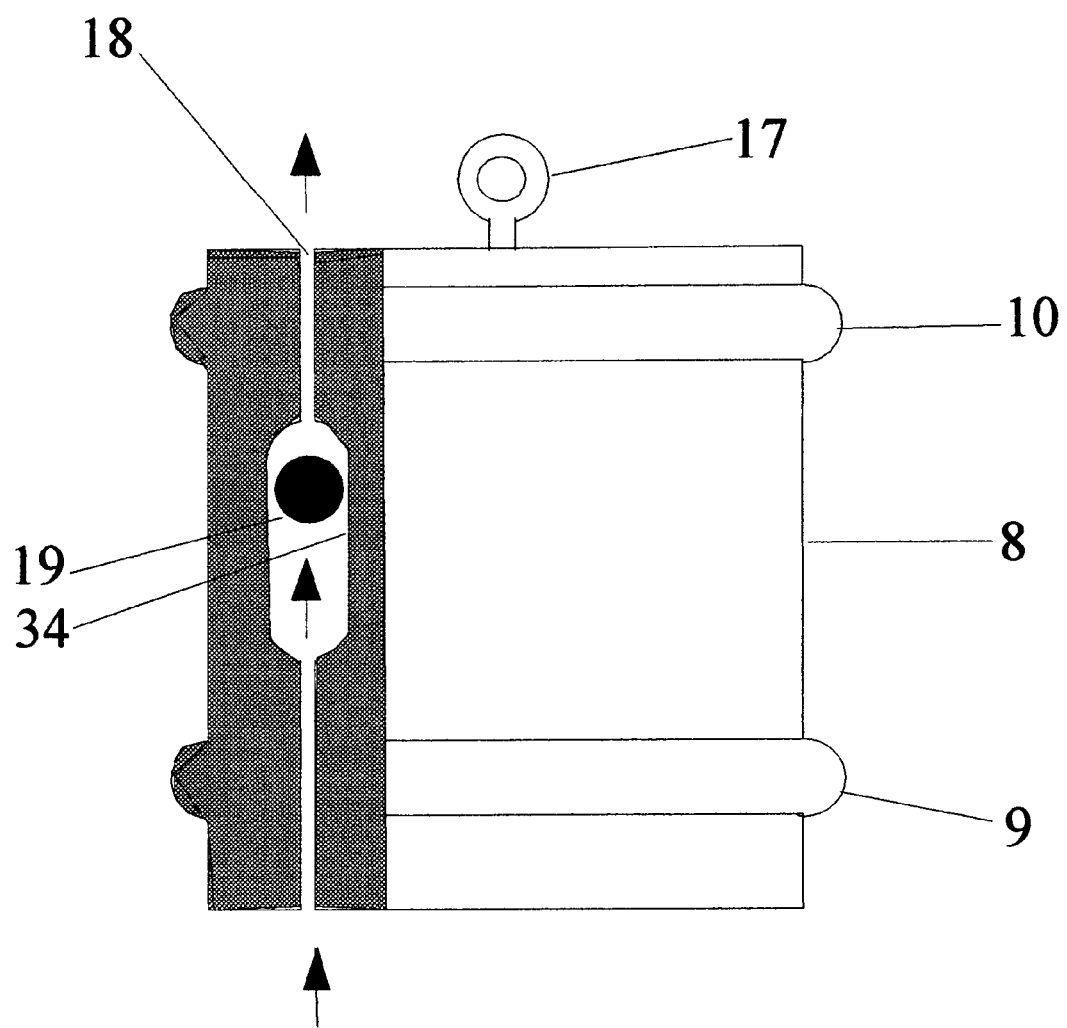
FIG. 5 of 11 shows the weighted piston with "O" rings and a cross section revealing the air vent check valve.
Figure 6:
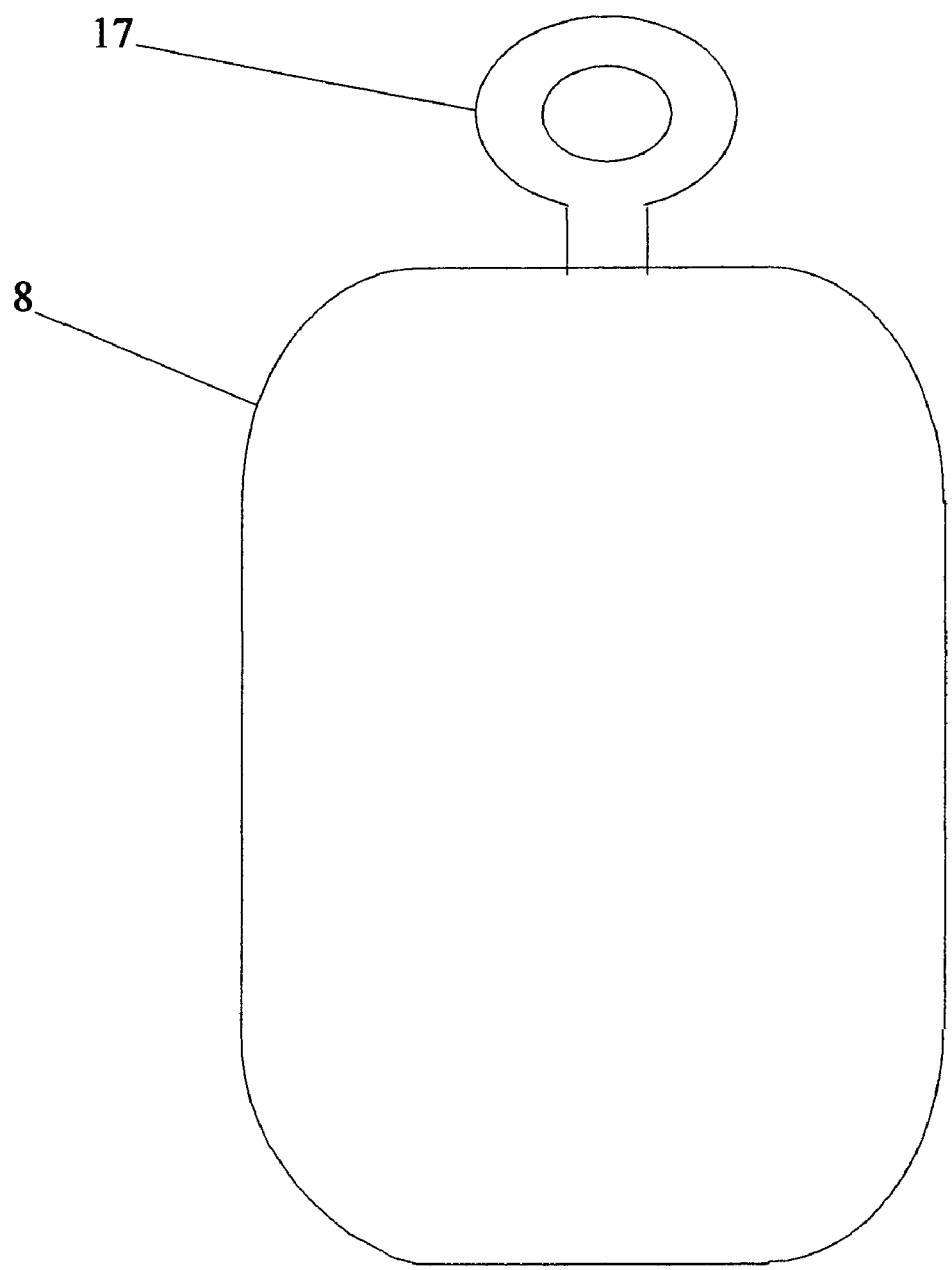
FIG. 6 of 11 shows the weighted piston without "O" rings and air vent.
Figure 7:
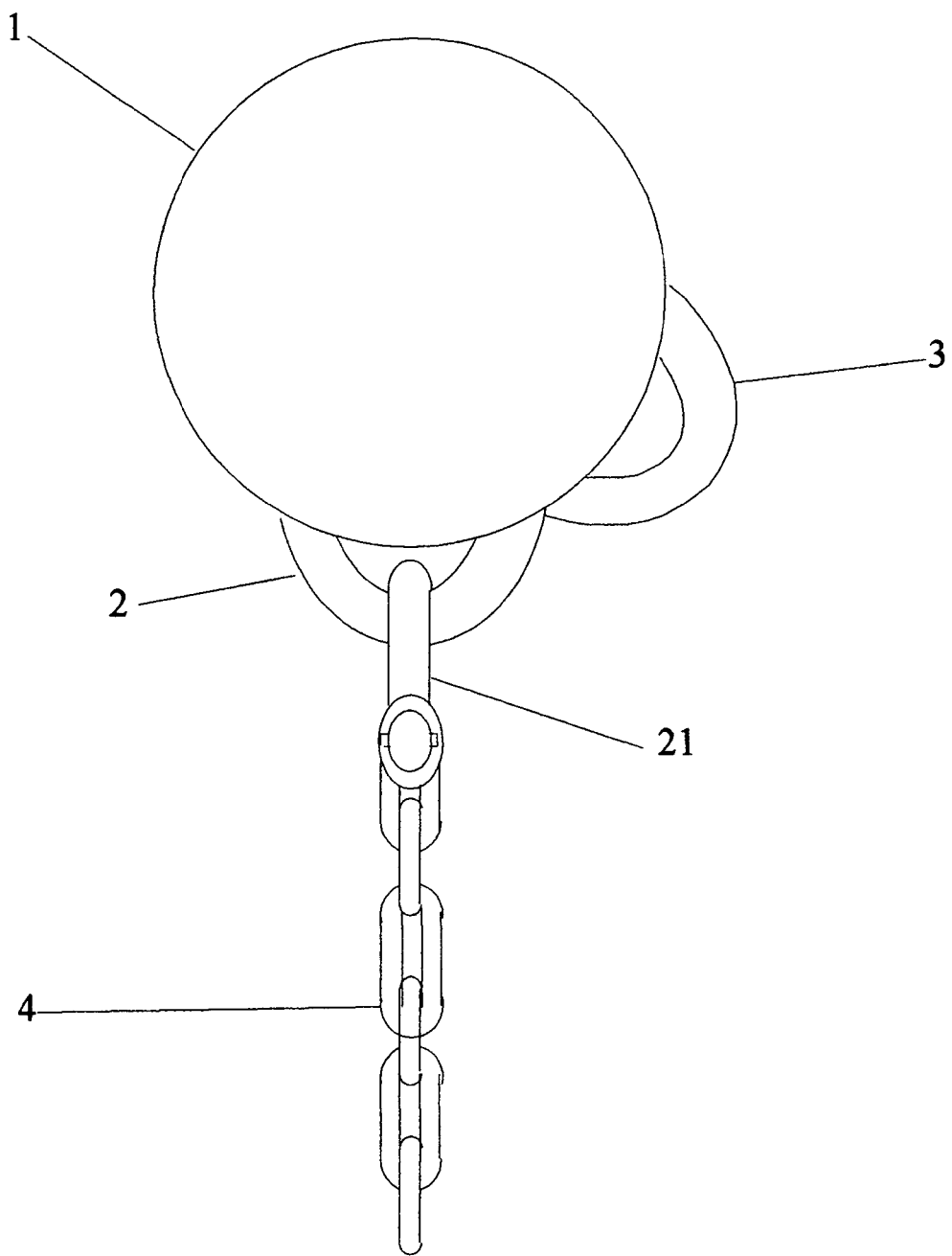
FIG. 7 of 11 shows a closer look at the lifting buoy and connections.

A second shackle or clevis (16) is attached to eyebolt (17) shown in FIG. 3. The eyebolt (17) is imbedded in the weighted piston (8), FIGS. 3 and 5. The ballast weighted piston (8), may have one or more sealing rings (9), FIGS. 1, 2, 3, 4, 5 and 6. The bottom ring (9) provides the primary seal while the upper ring (10) stabilizes the direction of travel as well as providing a second seal. An air vent (18) with check valve ball (19) and air vent chamber (34), FIG. 5 is provided in the weighted piston (8) to prevent air entrapment. The ball (19) falls to the bottom of vent chamber (34) when air is trapped below. The air passes by the ball (19). When water enters the vent (18) and chamber (34) from below, the ball (19) becomes buoyant, rising to the top of the vent chamber 34, sealing the flow of water but not air. The pump cylinder (7) may be provided with a replaceable pump sleeve (56), a, flange (52) with fasteners (53) to fasten the flange (52) to pump cylinder flange (57) to contain said cylinder (56) and restrict the upper limits of travel of the ballast weighted piston 8. The hawser guide (54) is affixed to the flange (53) and the wear ring (55) is affixed to the hawser guide (54). The lower limit of travel in FIG. 4 is restricted by inlet pipe (57) and outlet pipe (58). The replaceable pump cylinder sleeve has an upper outwardly protruding lip (60) to secure said sleeve between aforementioned flanges and a lower inwardly protruding lip (59) to restrict the lower limits of travel of the ballast weighted piston (8).

The ratio of the volume of water displaced by larger pistons (8) in relation to the amount of water capable of escaping between the wall of the cylinder, (7) FIGS. 1, 2, 3, 4, 8 and 9, and the ballast weighted piston (8) may be sufficiently small to negate the need chamber (34) and check valve ball (19).

FIGS. 1, 2 and 3 show a mooring guide (5). FIG. 3 shows the mooring guide (5) with wear ring (20). The mooring guide (5) and wear ring (20) facilitate lining the lifting chain (4) over the center of the piston (8) and eyebolt (17).

FIGS. 1, 2 and 3 show stop pins (6) which restrict the upper reaches of the path of piston (8). The whole system is anchored with such sufficiency as to resist the entire submersion of buoy.

FIGS. 1, 2, and 3 show the pump cylinder (7), while FIG. 4 shows a replaceable pump cylinder sleeve (56) whose inner surfaces provides the seal for the piston rings 9 and 10. The length of pump cylinder 7 or pump cylinder sleeve (56) determines the maximum variance of tide and wave actions allowed in the performance of the pump and is key to this invention.

FIGS. 1, 2, 3, 4, 8 and 9 show the inlet check valve (11) which allows one way travel of water into the cylinder (7) when piston (8) is raised by buoy (1). Check valve (11) does not allow flow out of the cylinder (7). In the same figures, check valve (12) allows the one way travel of water out of cylinder (7) when the weighted piston (8) travels downward when buoy (1) descends to the bottom of a wave or ocean swell. Check valve (12) prevents and stops the travel of water back into cylinder (7).

Figure 8:
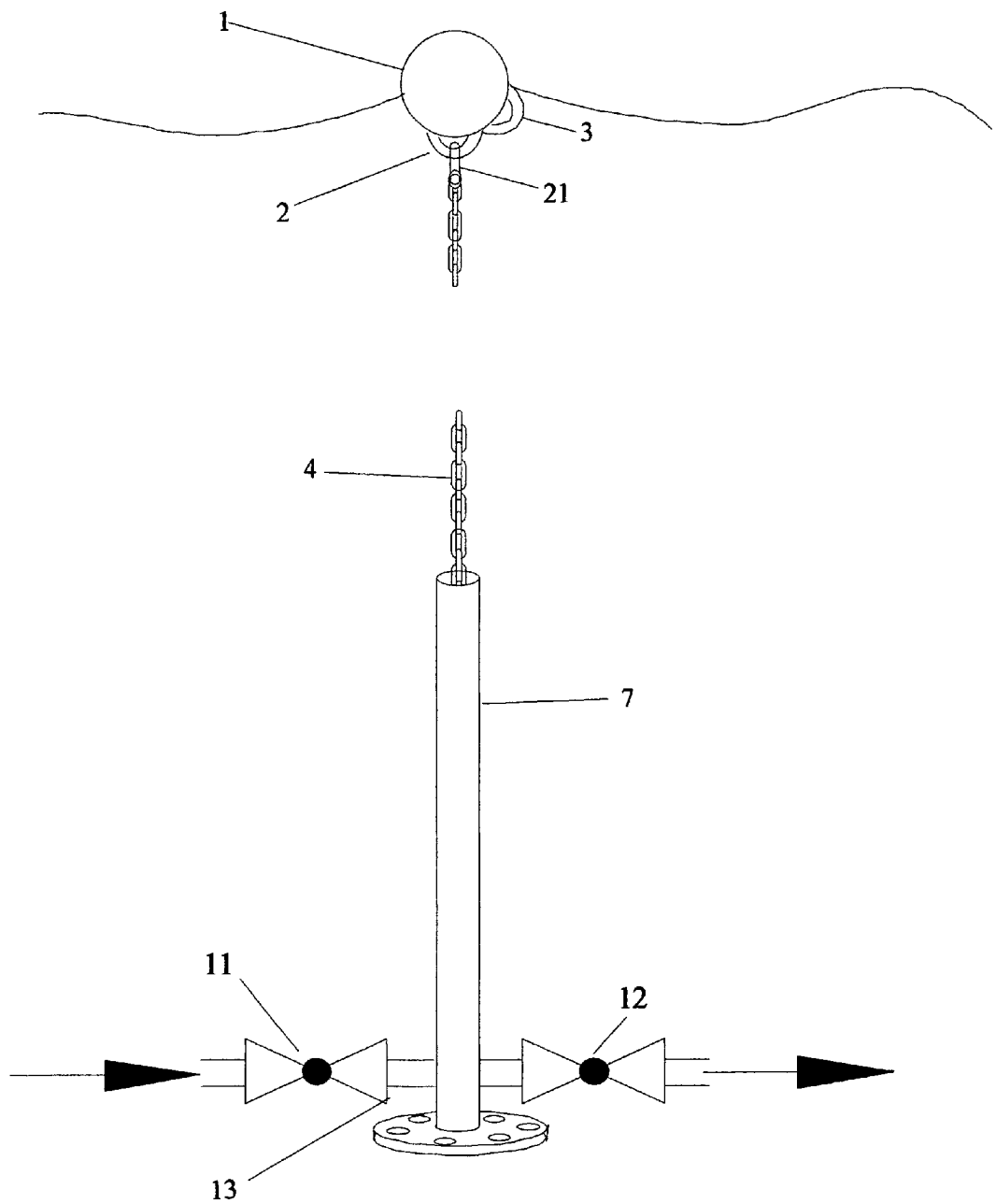
FIG. 8 of 11 is an isometric rendition showing what the wave and tidal pump will look like when installed on the bed of the ocean floor.
Figure 10:
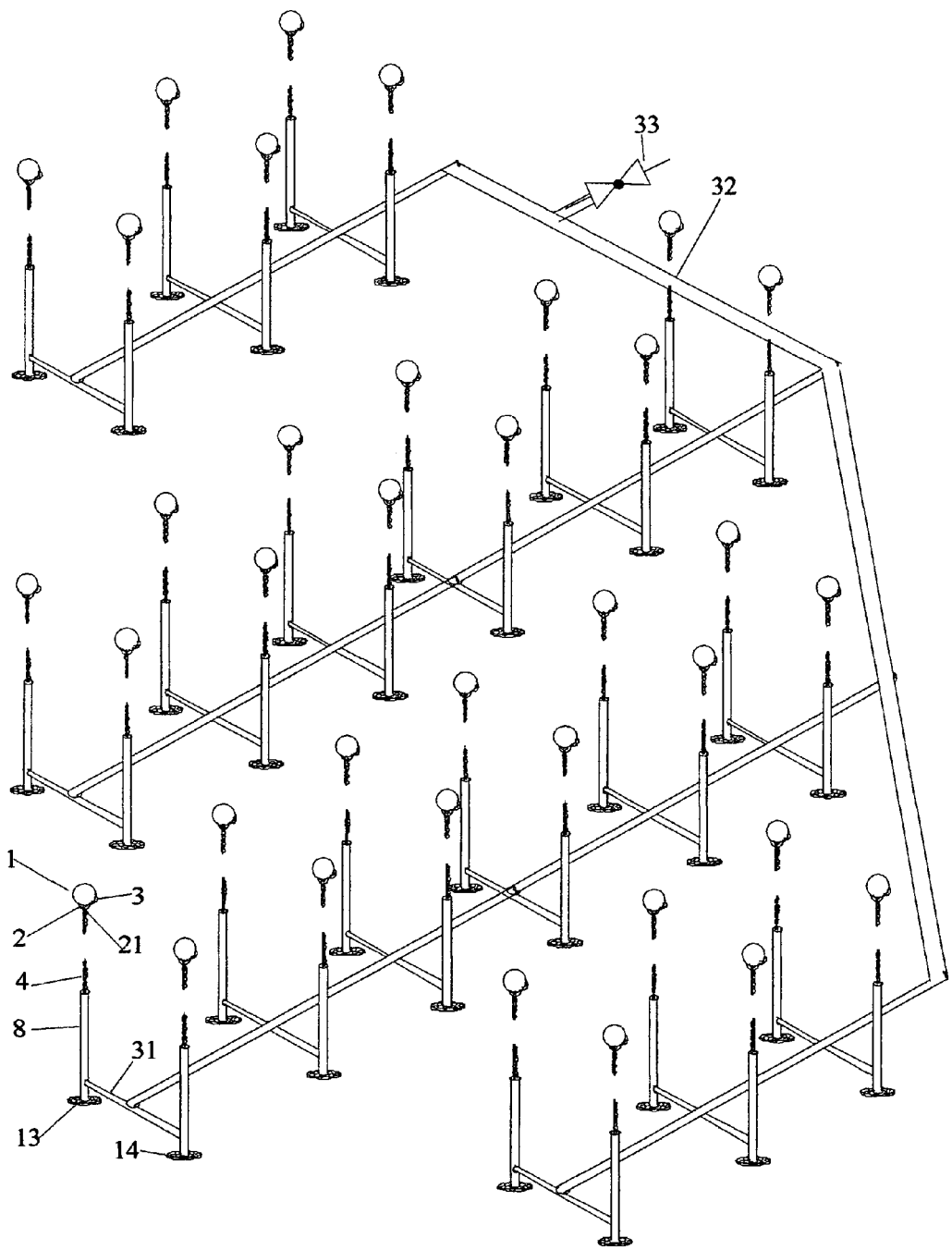
FIG. 10 of 11 is an isometric rendition showing wave and tidal pumps being used in concert and in clusters.
Figure 11:
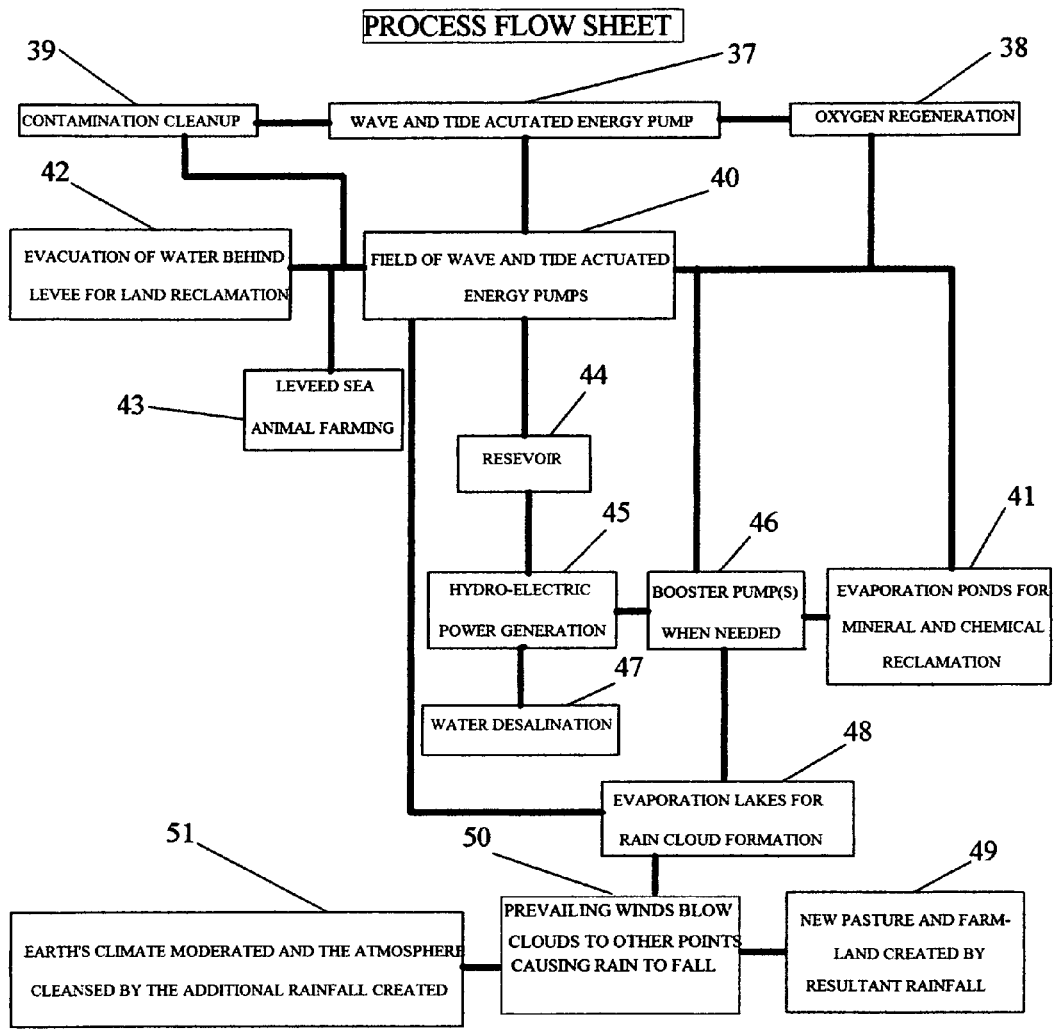
FIG. 11 of 11 is a flow chart showing applications of this wave and tide actuated pump.

FIGS. 1, 8 and 10 show a bottom flange plate (13) attached to the pump cylinder with bolt holes (14) for securing pumping cylinder (7) and related mechanisms to a suitable submerged foundation on the bottom of the ocean and ocean floor.

FIGS. 2, 3 and 8 show bottom plate (15), suitable for imbedding the pump cylinder in the ocean floor.

Figure 9:
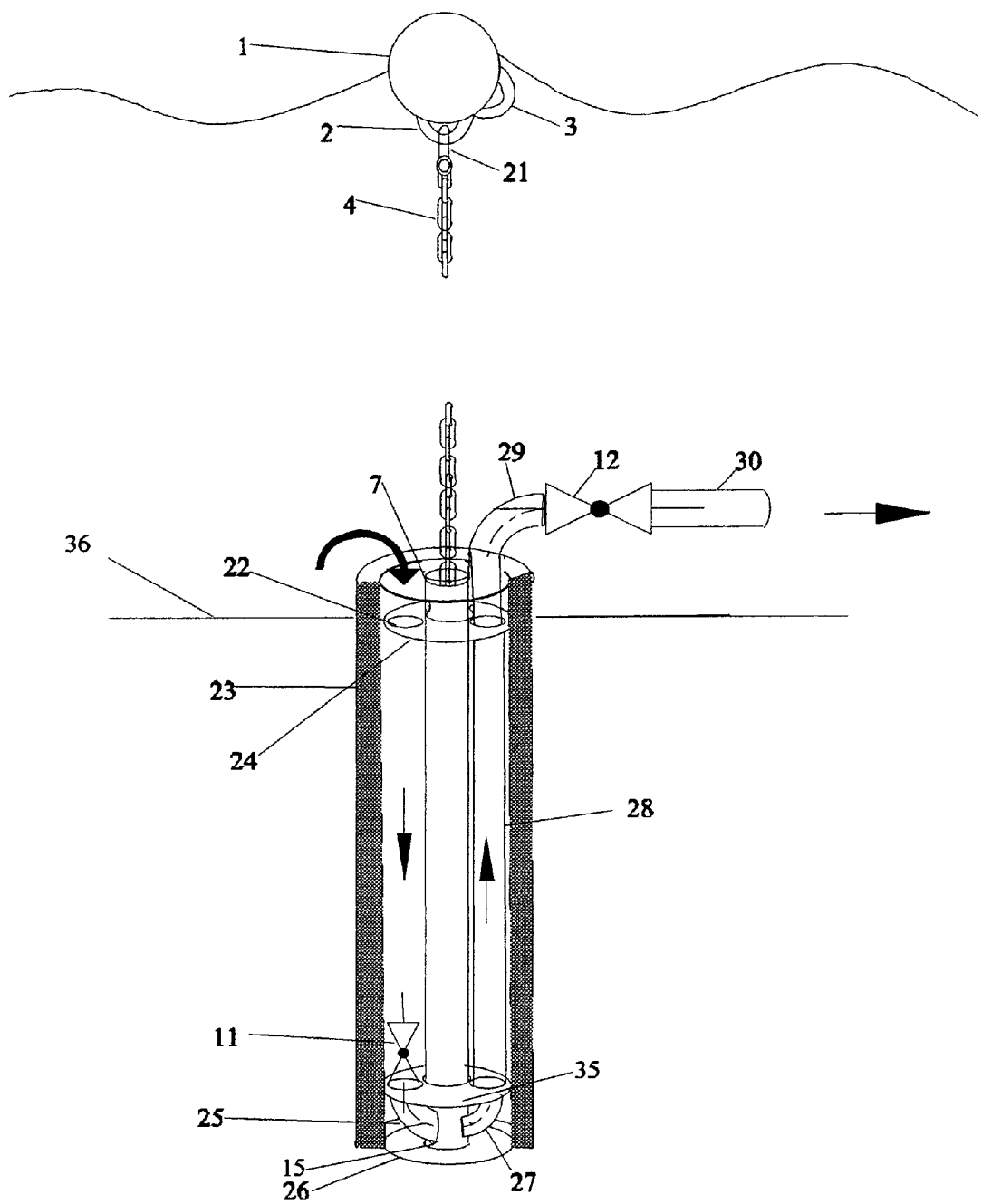
FIG. 9 of 11 is an isometric rendition showing what the wave and tidal pump will look like when installed imbedded in the bed of the ocean floor.

FIG. 9 shows the pump cylinder (7) imbedded in the ocean floor 36 in the protective casing (23), with support plates (24), (26) and (35) bracing and holding cylinder (7) in place. Support plate (24) is equipped with opening (22) to allow for the flow of water to the check valve (11) below. Support plate (35) is similarly equipped with a check valve (11) mounted on top and a 90 degree elbow (25) mounted below allowing for the one way flow of water into the cylinder (7). The ballast weighted piston (8) and buoy (1) perform in their usual manner pumping water out of cylinder (7) into the pressure side 90 degree elbow (27) through plate (35) via discharge pipe (28), a second 90 degree elbow 29 through the one way pressure side check valve (12) thence to discharge pipe (30). FIG. 8 is an isometric representation showing (36) wave and tide actuated pumps, mounted on the ocean floor, being used in concert, connected together with piping (31). A final one way pressure check valve (33) may be provided at the last outlet as a safety measure.

I claim:

1. A wave and tide actuated submersible pump for use in an open body of water, said wave and tide actuated submersible pump comprising a pump cylinder (7) having an open top end and a closed bottom end (13), said cylinder (7) is affixed to a structure located in an open body of water, at least one inlet check valve (11) and at least one outlet check valve (12) connected to openings in the pump cylinder (7) near the lower end of said cylinder (7), said at least one inlet check valve (11) allowing for the intake of water from the body of water and said at least one outlet check valve (12) controlling the flow of water from the pump to a remote location, a ballast-weighted piston (8) vertically reciprocally movable within the pump cylinder (7) and forming a pump chamber defined by a sidewall of said cylinder, said ballast-weighted piston and the bottom end of said cylinder, said piston ballast-weight is sufficient to pump the fluid in which it is contained while returning said piston to its' lowest point of travel, a buoy (1) connected to the ballast-weighted piston (8) by a flexible connector (4) for driving the ballast-weighted piston (8) on an upward stroke in response to wave action, said ballast-weighted piston (8) being driven in a downward stroke under force of gravity, a means for restricting the upward stroke of the ballast-weighted piston (8) within the pump cylinder (7), a hawser guide (5), (54) and wear ring (20), (55) are mounted to the open top of said pump cylinder, said flexible connector (4) passing through the top of said cylinder (7) and said wear ring (20), (55) and being attached to the top of the ballast-weighted piston (8) at a first end and to a lifting eye of the buoy (1) at a second end.

2. The wave and tide actuated submersible pump of claim 1 wherein said means for restricting the upward stroke of the ballast-weighted piston (8) is a plurality of stop pins (6) which are securely attached and pass through openings adjacent said open top end of the pump cylinder (7).

3. The wave and tide actuated submersible pump of claim 1 wherein the pumping chamber is defined by a replaceable pump cylinder sleeve (56), a said ballast weighted piston (8) and said closed bottom end of the pump cylinder (7), said replaceable pump cylinder sleeve has an upper outwardly protruding lip (60) and a lower inwardly protruding lip (59), said lower lip restricts the downward movement of the ballast weighted piston (8);
- said means for restricting the upward stroke of the ballast-weighted piston comprising a hawser flange (52) having said hawser guide and said wear ring attached thereto;
- said pump cylinder includes an outwardly protruding pump flange (61) at the open top end; and,
- said upper outwardly protruding lip is secured between said hawser flange and said pump flange.

4. The wave and tide actuated submersible pump of claim 1 wherein said closed bottom end comprises is a bottom plate (15) suitable for imbedding the pump cylinder in the floor of the open body of water.

5. The wave and tide actuated submersible pump of claim 1 wherein said bottom closed end comprises a bottom flange plate (13) for securing the pump cylinder to submerged foundations at the floor of the open body of water.

6. The wave and tide actuated submersible pump of claim 1 wherein said ballast-weighted piston (8) includes sealing rings (9), (10) to provide a seal against the pump cylinder (7).

7. The wave and tide actuated submersible pump of claim 1 wherein said buoy (1) includes a mooring eye (3) used to stabilize the direction of travel of the buoy (1).

8. The wave and tide actuated submersible pump of claim 1 wherein a replaceable pump cylinder sleeve (56) having a flange (52) is placed in the pumping cylinder (7) and secured in place with fasteners (53) to a pump flange (57) protruding from the open top end of said pump cylinder (7).

9. The wave and tide actuated submersible pump of claim 1 wherein said ballast-weighted piston (8) includes an air vent passageway (18), a check valve ball (19) and an air vent chamber (34) for allowing air entrapped within the pump chamber to vent through the air vent passageway and out the open top end of the pump cylinder (7).

10. The wave and tide actuated submersible pump of claim 1 wherein the water pumped by the submersible pump is delivered by said at least one outlet check valve (12) to a hydro-electric power plant (45).

11. The wave and tide actuated submersible pump of claim 1 wherein the water pumped by the submersible pump is delivered by said at least one outlet check valve (12) to pump contaminated fluid into evaporation ponds or large bodies of water for mineral and chemical extraction, refinement (41) and toxic waste removal from contaminated fluids (39).

12. The wave and tide actuated submersible pump of claim 1, wherein the water pumped by the submersible pump is delivered by said at least one outlet check valve (12) to pump salt water, to create a large body of water for the evaporation of said water thus forming moisture laden clouds (50) resulting in rain which can crate new pasture and farmland (49).

13. The wave and tide actuated submersible pump of claim 1 wherein the water is salt water which is pumped by the submersible pump is delivered by said at least one outlet check valve (12) to a desalination plant to extract fresh water (47).

14. The wave and tide actuated submersible pump of claim 1 wherein the water pumped by the submersible pump is delivered by said at least one outlet check valve (12) to a levied reservoir (44) to create hydro electric power (45).

15. The wave and tide actuated submersible pump of claim 1 wherein the water pumped by the submersible pump is delivered outside a levied area by said at least one outlet check valve (12) to claim land from the sea by using these pumps operating the pump with said at least one inlet check valve communicating with the levied area, to pump water out of said levied area (42).

16. The wave and tide actuated submersible pump of claim 1 where the water pumped by the submersible pump is delivered by said at least one outlet check valve (12) to a reservoir (43) to raise sea animals and organisms for harvesting of said sea animals and organisms (43).

* * * * *